United States Patent [19]
Blouin et al.

[11] Patent Number: 6,016,140
[45] Date of Patent: Jan. 18, 2000

[54] AUTOMATIC TOUCH SCREEN CALIBRATION

[75] Inventors: Francois Blouin; Guillaume Comeau, both of Hull, Canada

[73] Assignee: Nortel Networks Corporation, Montreal, Canada

[21] Appl. No.: 08/960,218

[22] Filed: Oct. 29, 1997

[51] Int. Cl.[7] ............................................. G09G 3/00
[52] U.S. Cl. ..................... 345/178; 345/173; 345/174; 178/18.02; 178/18.05
[58] Field of Search .................... 345/173, 174, 345/178; 178/18.02, 18.05

[56] References Cited

U.S. PATENT DOCUMENTS

| | | | |
|---|---|---|---|
| 4,710,758 | 12/1987 | Mussler et al. .................... | 345/178 |
| 5,283,559 | 2/1994 | Kalendra et al. .................. | 345/178 |
| 5,471,226 | 11/1995 | Suzuki et al. ..................... | 345/178 |
| 5,751,276 | 5/1998 | Shih ................................... | 345/178 |

*Primary Examiner*—Bipin Shalwala
*Assistant Examiner*—Vincent E. Kovalick

[57] ABSTRACT

A system and method for automatically recalibrating a resistive touch screen. The resistance of a resistive touch screen layer is subject to change over time, while the resistance of silver bus bars connecting the resistive touch screen layer to analog-to-digital converter (ADC) elements is not. Calibration tables are used to convert an ADC count representing a voltage across the entire touch screen to an ADC count representing a percentage drop across the touch screen layer only. A new calibration table is generated periodically by measuring the current through the touch screen and using this to determine a new voltage drop across the touch screen layer only.

21 Claims, 9 Drawing Sheets

Initial Touch Screen Conditions

| | | | |
|---|---|---|---|
| Rito | 400.00 | Ohms | (400 Ohms per sq) |
| Ag1 Bus Bar Length | 150.00 | mm | |
| Ag2 Bus Bar Length | 150.00 | mm | |
| Rag1= | 7.500 | Ohms | |
| Rag2= | 7.500 | Ohms | (50m Ohms per sq) |
| Vcc= | 5.000 | v | (50m Ohms per sq) |
| I=vcc/(Rag1+Rag2+Rito) | 0.012 | | |
| Vdrop=Rag1*I | 0.090 | | |
| Vito=Vcc-(Rag1+Rag2)*I | 4.819 | | 19 |
| A/D Full Scale | 1024 | | 987 |
| Sampling Step= | 0.005 | | |
| Display X Res | 640 | | |
| Display Y Res | 480 | | |

| Raw Data from A/D | Touch Data Corrected | Display X Coordinate | Display Y Coordinate |
|---|---|---|---|
| 0 | 0 | 0 | 0 |
| 64 | 47 | 30 | 22 |
| 128 | 114 | 71 | 53 |
| 192 | 180 | 113 | 84 |
| 256 | 246 | 154 | 116 |
| 320 | 313 | 196 | 147 |
| 384 | 379 | 237 | 178 |
| 448 | 446 | 279 | 209 |
| 512 | 512 | 320 | 240 |
| 576 | 578 | 362 | 271 |
| 640 | 645 | 403 | 302 |
| 704 | 711 | 445 | 333 |
| 768 | 778 | 486 | 365 |
| 832 | 844 | 528 | 396 |
| 896 | 910 | 569 | 427 |
| 960 | 977 | 611 | 458 |
| 1023 | 1023 | 639 | 480 |
| A1 | B1 | C1 | D1 |

Touch data corrected=(raw data - drop across ag bus bar)/Vito*1024
If touch data corrected<0 then data corrected=0
If touch data corrected> 1023 then touch data corrected=1023

Display X Coordinate=touch data corrected*display X res/A/D full scale
Display Y Coordinate=touch data corrected*display Y res/A/D full scale

Aging 1 (+20% ITO resistance variation)

| | | | | | |
|---|---|---|---|---|---|
| Rito | 400.00 | Ohms | (460 Ohms per sq) | | |
| Ag1 Bus Bar Length | 150.00 | mm | | | |
| Ag2 Bus Bar Length | 150.00 | mm | | | |
| Rag1= | 7.500 | Ohms | | | |
| Rag2= | 7.500 | Ohms | (50m Ohms per sq) | | |
| Vcc= | 5.000 | V | (50m Ohms per sq) | | |
| I=vcc/(Rag1+Rag2+Rito) | 0.015 | | | | |
| Vdrop=Rag1*I | 0.112 | | 23 | | |
| Vito=Vcc-(Rag1+Rag2)*I | 4.776 | | 978 | | |
| A/D Full Scale | 1024 | | | | |
| Sampling Step= | 0.005 | V | | | |
| Display X Res | 640 | | | | |
| Display Y Res | 480 | | | | |

| Raw Data from A/D | Touch Data Corrected | Display X Coordinate | Display Y Coordinate | Error Pixel X | Error Pixel Y |
|---|---|---|---|---|---|
| 0 | 0 | 0 | 0 | 0 | 0 |
| 64 | 43 | 27 | 20 | -3 | -2 |
| 128 | 110 | 69 | 52 | -2 | -2 |
| 192 | 177 | 111 | 83 | -2 | -1 |
| 256 | 244 | 153 | 114 | -1 | -1 |
| 320 | 311 | 194 | 146 | -1 | -1 |
| 384 | 378 | 236 | 177 | -1 | -1 |
| 448 | 445 | 278 | 209 | 0 | 0 |
| 512 | 512 | 320 | 240 | 0 | 0 |
| 576 | 579 | 362 | 271 | 0 | 0 |
| 640 | 646 | 404 | 303 | 1 | 1 |
| 704 | 713 | 446 | 334 | 1 | 1 |
| 768 | 780 | 488 | 366 | 2 | 1 |
| 832 | 847 | 529 | 397 | 2 | 1 |
| 896 | 914 | 571 | 428 | 2 | 2 |
| 960 | 981 | 613 | 460 | 3 | 2 |
| 1023 | 1023 | 639 | 480 | 0 | 0 |
| A2 | B2 | C2 | D2 | E2 | F2 |

FIG. 9

Aging 1 (+20% ITO resistance variation)

| | | | | | |
|---:|:---|:---|:---|:---|:---|
| Rito | 480.00 | Ohms | (460 Ohms per sq) | | |
| Ag1 Bus Bar Length | | | | | |
| Ag2 Bus Bar Length | | | | | |
| Rag1= | 7.500 | Ohms | (50m Ohms per sq) | | |
| Rag2= | 7.500 | Ohms | (50m Ohms per sq) | | |
| Vcc= | 5.000 | V | | | |
| I=vcc/(Rag1+Rag2+Rito) | 0.010 | A | | | |
| Vdrop=Rag1*I | 0.076 | V | 16 | | |
| Vito=Vcc-(Rag1+Rag2)*I | 4.848 | V | 993 | | |
| A/D Full Scale | 1024 | | | | |
| Sampling Step= | 0.005 | | | | |
| | | | | | |
| Display X Res | 640 | | | | |
| Display Y Res | 480 | | | | |

| Raw Data from A/D | Touch Data Corrected | Display X Coordinate | Display Y Coordinate | Error Pixel X | Error Pixel Y |
|---:|---:|---:|---:|---:|---:|
| 0 | 0 | 0 | 0 | 0 | 0 |
| 64 | 50 | 31 | 23 | 2 | 1 |
| 128 | 116 | 73 | 54 | 2 | 1 |
| 192 | 182 | 114 | 85 | 1 | 1 |
| 256 | 248 | 155 | 116 | 1 | 1 |
| 320 | 314 | 196 | 147 | 1 | 1 |
| 384 | 380 | 238 | 178 | 1 | 0 |
| 448 | 446 | 279 | 209 | 0 | 0 |
| 512 | 512 | 320 | 240 | 0 | 0 |
| 576 | 578 | 361 | 271 | 0 | 0 |
| 640 | 644 | 403 | 302 | -1 | 0 |
| 704 | 710 | 444 | 333 | -1 | -1 |
| 768 | 776 | 485 | 364 | -1 | -1 |
| 832 | 842 | 526 | 395 | -1 | -1 |
| 896 | 908 | 568 | 426 | -1 | -1 |
| 960 | 974 | 609 | 457 | -2 | -1 |
| 1023 | 1023 | 639 | 480 | 0 | 0 |

AUTOMATIC TOUCH SCREEN CALIBRATION

FIELD OF THE INVENTION

The invention relates to the calibration of touch screens.

BACKGROUND OF THE INVENTION

Analog resistive touch screens are one of the most popular technologies used today in consumer electronic products such as PDAs (personal digital assistants), calculators and toys. The main reasons for this are that they are inexpensive and simple to integrate.

Resistive touch screens use ITO (Indium Tin Oxide) as a resistive element for pen/finger detection. When a pen or finger is used to press a particular location on the touch screen, this is converted into coordinates identifying the location. It is important that the coordinates accurately identify the location. Because ITO properties vary significantly over time and when exposed to temperature and humidity variation, readings of the touch screen may be converted to inaccurate coordinates thereby causing a malfunction of the product.

In order to deal with this problem, conventional resistive touch screens must be periodically manually recalibrated. A manual calibration setup menu typically asks the user to touch the four corners of the touch screen. The readings obtained for these touches are used to perform recalibration. This process must be repeated every six months or so. Unfortunately, most of the users forget to do it or do not understand well how to do it. This can result in inaccurate positioning and errors or malfunctions of the product.

U.S. Pat. No. 5,283,559 entitled "Automatic Calibration of a Capacitive Touch Screen used with a Fixed Element Flat Screen Display Panel" which issued Feb. 1, 1997 to Kalendra et al. discloses a system for recalibrating capacitive touch screens. This system is not applicable for resistive touch screens as the capacitive touch screen technology is entirely different.

SUMMARY OF THE INVENTION

It is an object of the invention to obviate or mitigate one or more of the above identified disadvantages.

According to a first broad aspect, the invention provides a method of recalibrating a resistive touch screen layer of a touch screen apparatus, the touch screen layer having a first bus bar with a constant resistance Rag1, and a second bus bar with a constant resistance Rag2, and a conductive layer between the two bus bars having a resistance Rito which is subject to change over time, wherein a voltage Vcc applied across Rag1, Rito and Rag2 results in voltage drops Vdrop1, Vito, and Vdrop2 across respective resistances Rag1, Rito and Rag2, wherein when the conductive layer is touched at a particular point, a voltage divider is created having a raw output which is a function of (Vdrop2+VB)/Vcc where VB is the voltage across a portion of Rito between Rag2 and the particular point, and wherein at least one initial parameter is stored in the touch screen apparatus which will permit the determination of Rag1 and Rag2, the method comprising the steps of: measuring at least one calibration parameter which together with the at least one initial parameter will permit the computation of Vdrop1 and Vdrop2; using the at least one calibration parameter to create a look-up table which maps a set of said output values, the set being a function of (Vdrop2+VB)/Vcc, onto a corrected set of output values, the corrected set being a function of VB/Vito.

According to a second broad aspect, the invention provides a recalibratable resistive touch screen apparatus comprising a resistive touch screen layer having a first bus bar with a constant resistance Rag1, and a second bus bar with a constant resistance Rag2, and a conductive layer between the two bus bars having a resistance Rito which is subject to change over time, wherein a voltage Vcc applied across Rag1, Rito and Rag2 results in voltage drops Vdrop1, Vito, and Vdrop2 across respective resistances Rag1, Rito and Rag2, an ADC (analog-to-digital converter) connected to produce a raw ADC count representative of a voltage across a portion of Rito and Rag2 when the conductive layer is touched at a particular point, the raw ADC count being a function of (Vdrop2+VB)/Vcc where VB is the voltage across the portion of Rito between Rag2 and the particular point, a processing means connected to receive the raw ADC count; means for initially storing at least one initial parameter which will permit the determination of Rag1 and Rag2; means for measuring at least one calibration parameter which together with the at least one initial parameter will permit the computation of Vdrop1 and Vdrop2; wherein the processing means is for using the at least one calibration parameter to create a look-up table which maps a set of said output values, the set being a function of (Vdrop2+VB)/Vcc, onto a corrected set of output values, the corrected set being a function of VB/Vito.

According to a third broad aspect the invention provides a recalibratable resistive touch screen apparatus comprising: a first resistive touch screen layer having a first bus bar with a constant resistance Rag1, and a second bus bar with a constant resistance Rag2, and a first conductive layer between the first and second bus bars having a resistance Rito1 which is subject to change over time, wherein a voltage Vcc applied across resistances Rag1, Rito1 and Rag2 results in voltage drops Vdrop1, Vito1, and Vdrop2 across respective resistances Rag1, Rito and Rag2, a second resistive touch screen layer having a third bus bar with a constant resistance Rag3, and a fourth bus bar with a constant resistance Rag4, and a second conductive layer between the third and fourth bus bars having a resistance Rito2 which is subject to change over time, wherein a voltage Vcc applied across resistances Rag3, Rito2 and Rag4 results in voltage drops Vdrop3, Vito2, and Vdrop4 across respective resistances Rag3, Rito2 and Rag4, and wherein the third and fourth bus bars are parallel with each other and perpendicular with the first and second bus bars; an ADC (analog-to-digital converter) connected to 1) produce a first raw ADC count representative of a first voltage across a portion of Rito1 and Rag2 when the first conductive layer is touched at a particular point while the voltage Vcc is applied there across, the first raw ADC count being a function of (Vdrop2+VB1)/Vcc where VB1 is the voltage across the portion of Rito between Rag2 and the particular point, and 2) produce a second raw ADC count representative of a second voltage across a portion of Rito2 and Rag4 when the second conductive layer is touched at said particular point while the voltage Vcc is applied there across, the second raw ADC count being a function of (Vdrop4+VB2)/Vcc where VB2 is the voltage across the portion of Rito2 between Rag4 and the particular point; a processing means connected to receive the raw ADC counts; means for initially storing at least a first initial parameter which will permit the determination of Rag1, Rag2, Rag3, and Rag4; means for measuring at least one calibration parameter which together with the at least one initial parameter will permit the computation of Vdrop1, Vdrop2, Vdrop3, and Vdrop4; wherein the processing means is for using the at least one calibration parameter to create a first look-up table which maps a set of said first raw ACD counts, the set being a function of (Vdrop2+VB1)/Vcc, onto a first corrected set of output values, the first corrected set being a function of VB1/Vito1, and to create a second look-up table which maps a set of said second raw ACD counts, the set being a function of (Vdrop4+VB2)/Vcc, onto a second corrected set of output values, the second corrected set being a function of VB2/Vito2.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
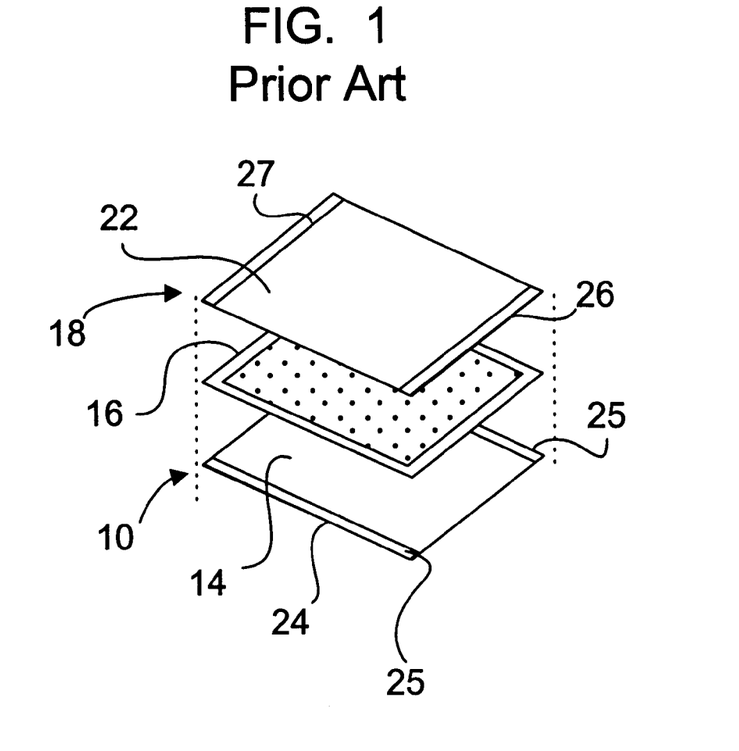
FIG. 1 is an exploded perspective view of a conventional analog resistive touch screen.
Figure 2:
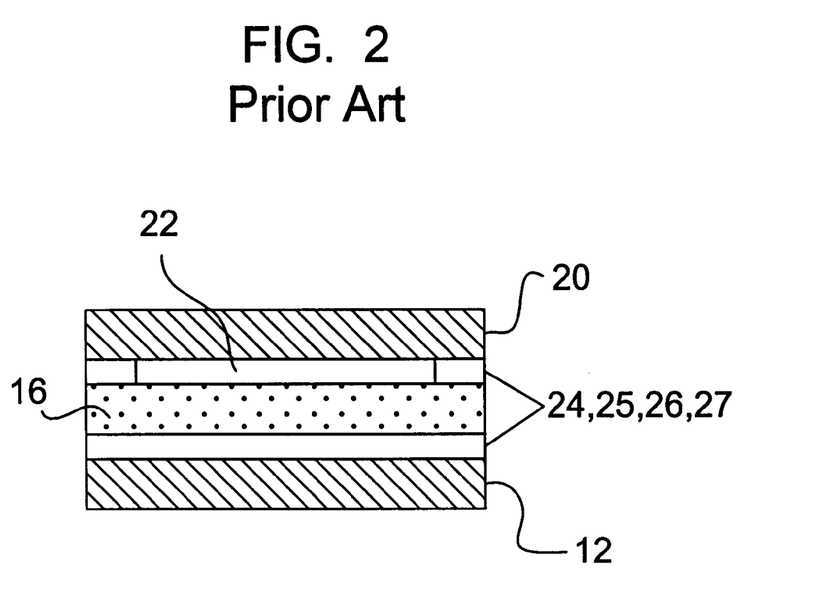
FIG. 2 is a side view of the touch screen of FIG. 1.

An analog resistive touch screen, such as illustrated in FIGS. 1 and 2 which are exploded perspective and side sectional views respectively, includes a transparent bottom layer 10 having a bottom substrate 12 below a first conductive ITO coating 14, a transparent spacer layer 16, and a transparent top layer 18 having a top substrate 20 above a second conductive ITO coating 22. The bottom layer 10 has two conductive bus bars 24,25 along two of its sides and the top layer 18 has two conductive bus bars 26,27 along two of its sides. The bottom conductive bus bars 24,25 are perpendicular to the top conductive bus bars 26,27. The bus bars 24,25,26,27 are typically made of silver (ag).

Figure 3:
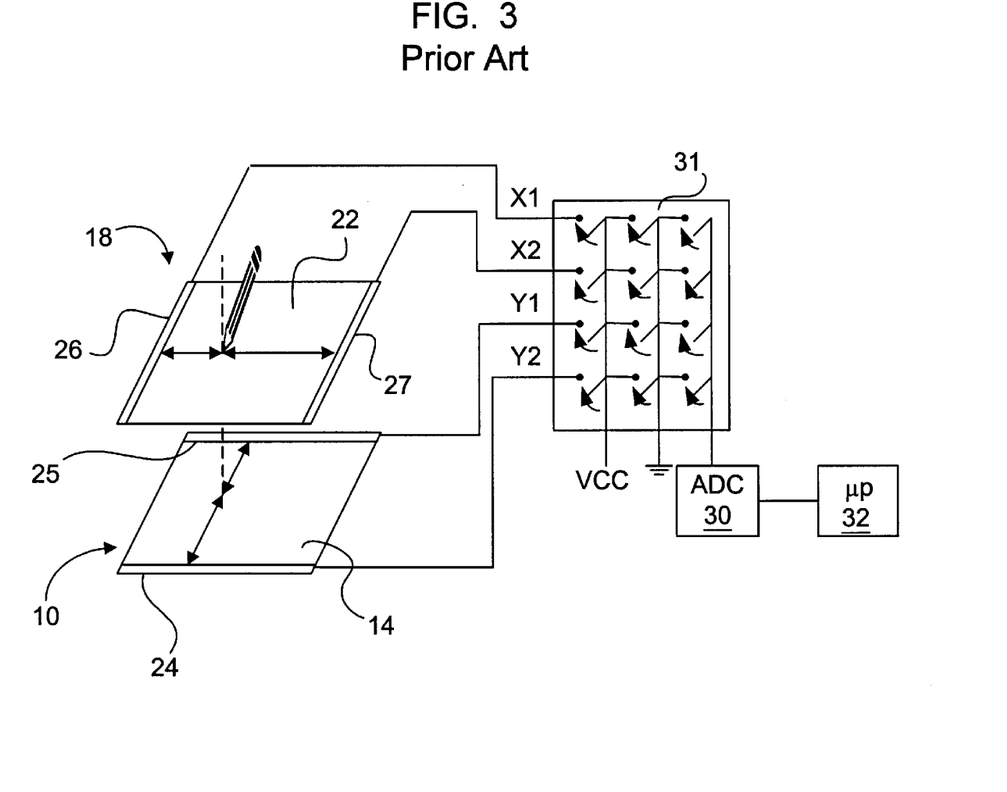
FIG. 3 is a simplified perspective view of the touch screen of FIG. 1 showing the mechanical interconnections.

The mechanical interconnections are shown in FIG. 3. The two bottom bus bars 24,25 are connected to terminals Y1,Y2 and the two top bus bars 26,27 are connected to terminals X1,X2. The resistive touch screen controller 31 is connected to the four terminals X1,X2,Y1,Y2 and contains a crossbar switch for connecting any of the terminals to Vcc ground or to an ADC (analog-to-digital convertor) 30, The ADC (analog-to-digital converter) 30 measures the voltage of any terminal X1,X2,Y1,Y2 and produces an ADC count representative of the voltage measured. This is then passed to the system requiring the measurement which in the illustrated example is simply a microprocessor 32.

Figure 4:
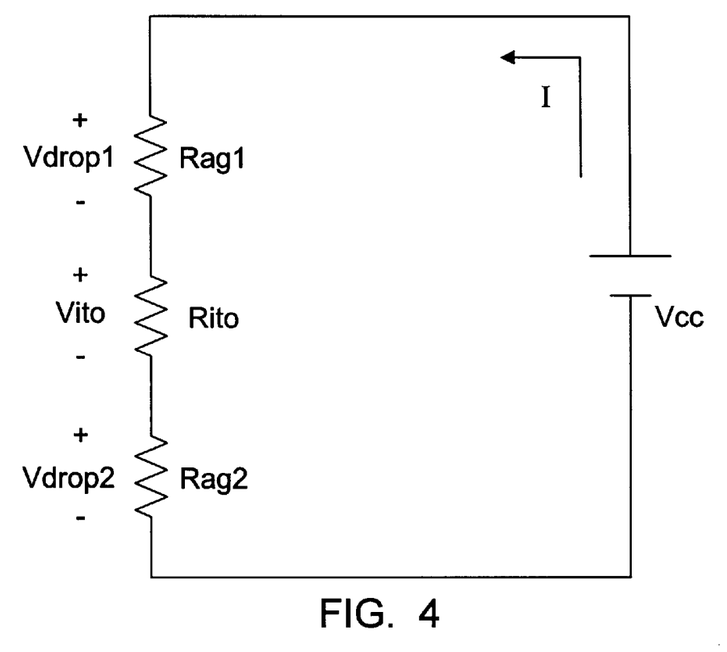
FIG. 4 is an equivalent circuit of the touch screen of FIG. 1 in the absence of any touch.

An analog resistive touch screen works by applying a voltage gradient across one conductive layer and measuring the voltage at the point of contact with the opposing conductive layer, this process being repeated for the top and bottom of conductive layers to get X and Y coordinates for the location of the touch. The contact between the layers is caused by the actuation with a finger or stylus which brings the two conductive layers 14,22 into electrical contact, which is detected as a switch closure. The measurement of the Y coordinate will be described by way of example with reference to FIG. 3. A voltage Vcc is applied between the terminals Y1,Y2 and hence across the two bottom bus bars 24,25 resulting in a voltage gradient between them. The two top bus bars 26, 27 are left floating, and the ACD 30 is connected to receive a voltage Vout from one or both of the top bus 26,27. The equivalent circuit for the bottom touch screen layer in the absence of any touch is shown in FIG. 4. The equivalent circuit includes a resistance Rag1 for a first one of the bus bars 24, a resistance Rito for the ITO screen 14, and a resistance Rag2 for a second one of the bus bars 25. A voltage Vcc is shown applied across the resistances Rag1, Rito and Rag2.

The current through the circuit is a constant equal to:

$$I=Vcc/(Rag1+Rag2+Rito)$$

The voltage drop across Rag1 is a constant equal to:

$$Vdrop1=Rag1*I$$

The voltage drop across Rag2 is a constant equal to:

$$Vdrop2=Rag2*I$$

The voltage drop across Rito is a constant equal to:

$$Vito=Vcc-(Rag1+Rag2)*I$$

Figure 5:
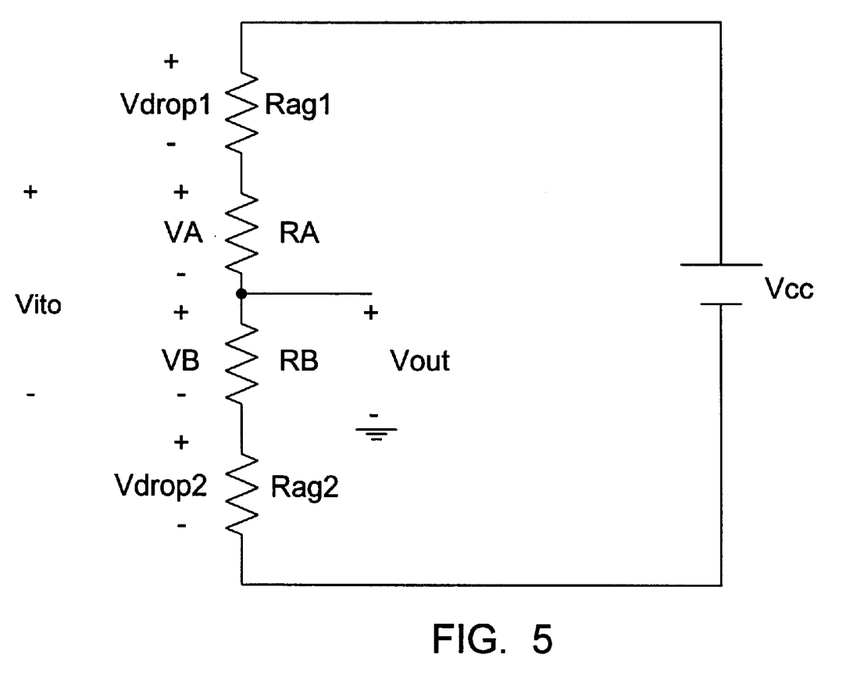
FIG. 5 is an equivalent circuit of the touch screen of FIG. 1 during a touch.

When the screen is touched, the effect is to divide Rito into two resistances RA,RB where RA+RB=Rito and to divide the voltage Vito into two voltages VA and VB, where VA+VB=Vito. The voltage which is measured is the voltage at the point of contact between the two touch screens, this being Vout=Vdrop2+VB. This voltage exists over the entire X plane consisting of the top controller layer 22 and the two top bus bars. The equivalent circuit for the screen after it has been touched is shown in FIG. 5.

The voltage Vout is converted by the ADC 30 to an output ADC reading (ADVout) which will be an ADC count representation of the voltage Vout.

If it assumed that a measurement of Vcc would be converted to the full scale reading ADC full-scale of the ADC 30 then ADVout satisfies:

$$ADVout=(VB+Vdrop2)/Vcc*(ADC\ full\text{-}scale)$$

However, it can be seen that this includes a component due to the voltage drop Vdrop2 across bus bar resistance Rag2. What is required is the voltage drop across RB as a fraction of the voltage drop across Rito, converted to a corrected ADC count ADcor. This may be expressed as:

$$ADcor=VB/Vito*(ADC\ full\text{-}scale)=(Vout-Vdrop2)/Vito)*ADC\ full\text{-}scale$$

subject to the constraint that if ADcor≦0 then ADcor=0, and if ADcor>ADC full-scale then ADcor=ADC full-scale.

As indicated above, the voltage Vcc has an ADC count equal to ADC full-scale. A single ADC count represents a voltage equal to the ADC sampling step. This sampling step may be expressed as:

$$DeltaV=Vcc/(ADC\ full\text{-}scale)$$

Vout, Vdrop, Vito all have ADC count equivalents computed by:

$$ADVout = Vout/DeltaV = measurement$$

$$ADVdrop2 = Vdrop2/DeltaV = constant$$

$$ADVito = Vito/DeltaV = constant$$

These ADC counts may be substituted into the above equation for ADcor to yield:

$$ADcor = (ADVout - ADVdrop2)/ADVito * ADC\ full\text{-}scale$$

The Y display coordinate is then computed from this value with the equation:

$$Y = ADcor * (Y\ Display\ resolution)/(ADC\ full\text{-}scale)$$

where Y display resolution is the resolution in the axis being measured, this being the Y axis for this example.

Using the above, a look-up table may be created for a specific set of parameters in which the raw ADC count data is mapped to corrected ADC data, or directly to display coordinates.

Figure 6:
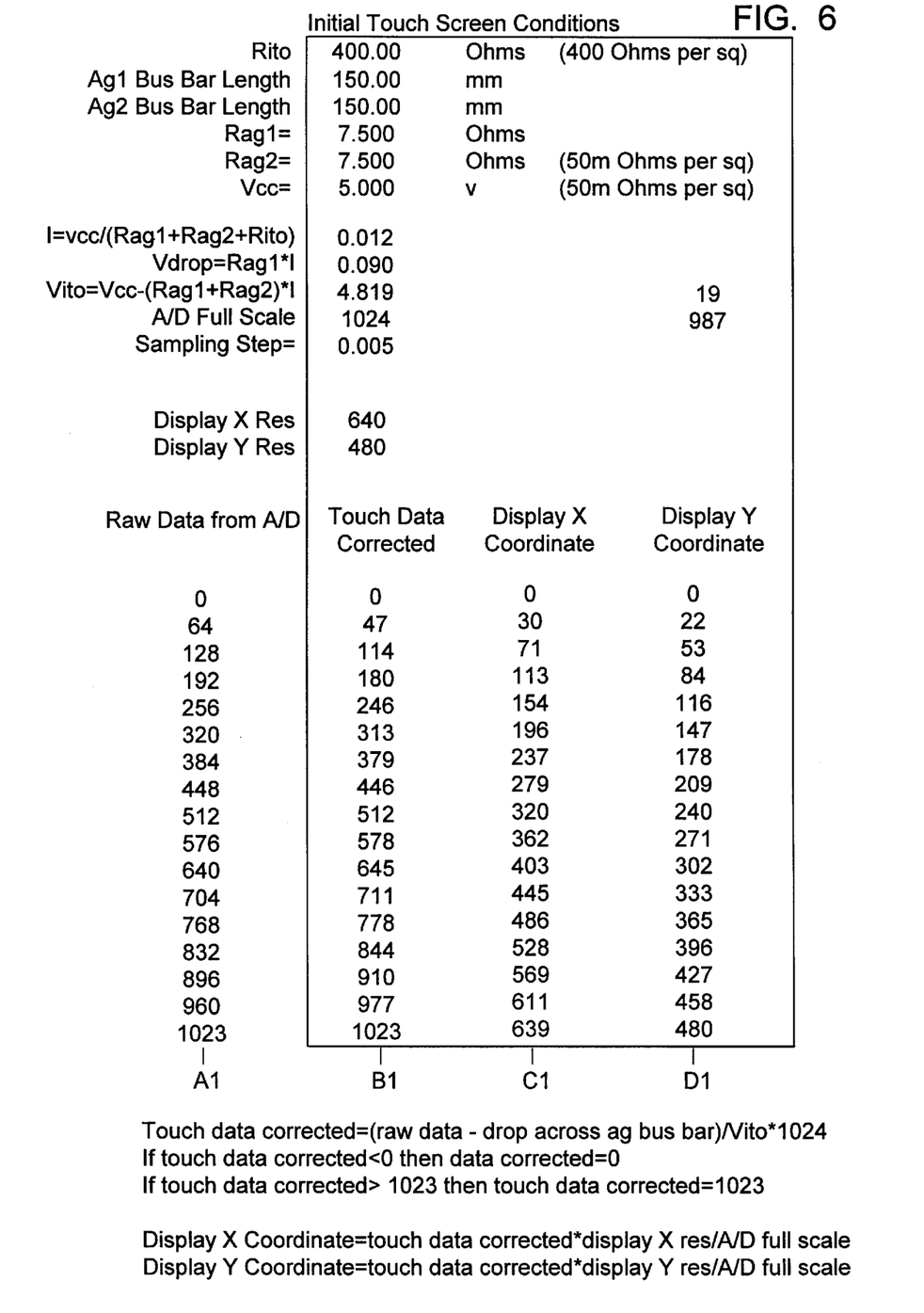
FIG. 6 is a tabulation of a touch screen calibration.

An example of this is shown in FIG. 6. In order to create such a table, Vdrop2 (or ADVdrop2) must be known, or Rag1 and Rag2 must be known. In this example, the bus bar resistance Rag1=Rag2=7.5 Ohms, Rito=400 Ohms, and Vcc=5.0 V. It is assumed that ADC full-scale is 1024 and that the X and Y display resolutions are 640 and 480 respectively. In column A1, ADVout is tabulated for a series of values covering the full ADC range of 0 to 1023. In column B1, the corrected ADC counts ADcor are tabulated. In column C1 and D1 the resulting display coordinates for X and Y are tabulated.

Figure 7:
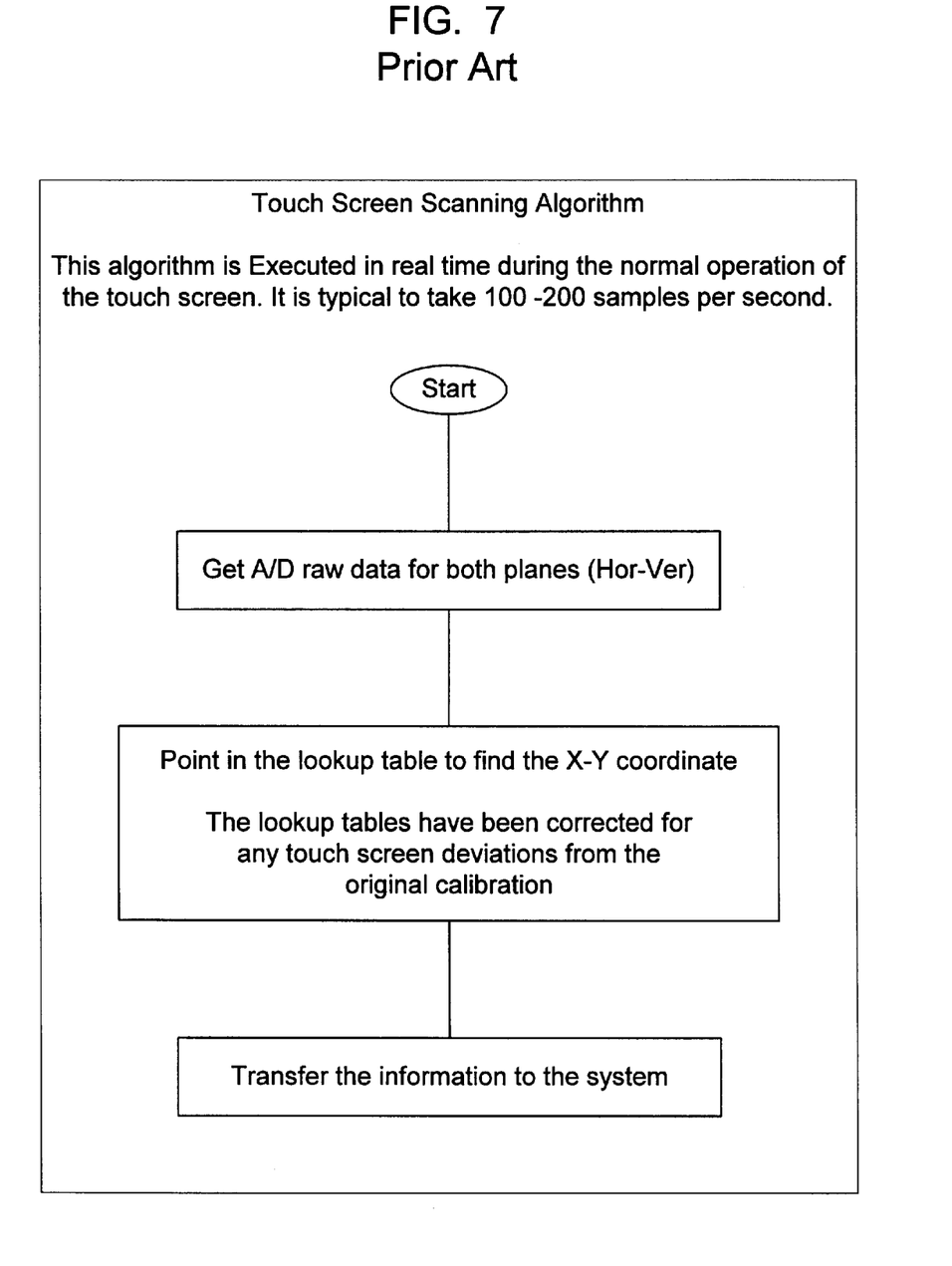
FIG. 7 is a flowchart of the conventional operation of a touch screen.

A look-up table such as the one illustrated in FIG. 6 is computed during calibration and stored in memory. An algorithm used during use of the touch screen will now be described with reference to FIG. 7. This algorithm is executed in real time during normal operation of the touch screen, and typically runs 100–200 times per second. The first step is to obtain ADVout for both planes (horizontal and vertical). The next step is to refer to the look-up table to find the X–Y coordinates. The final step is to transfer the X–Y coordinates to the system.

Over time, the resistance Rito will change as discussed above, and the calibration tables initially derived will no longer be correct because ADVito and ADVdrop2 will have changed. Over time, it is assumed that the bus bar resistances Rag1, and Rag2 remain constant.

Figure 8:
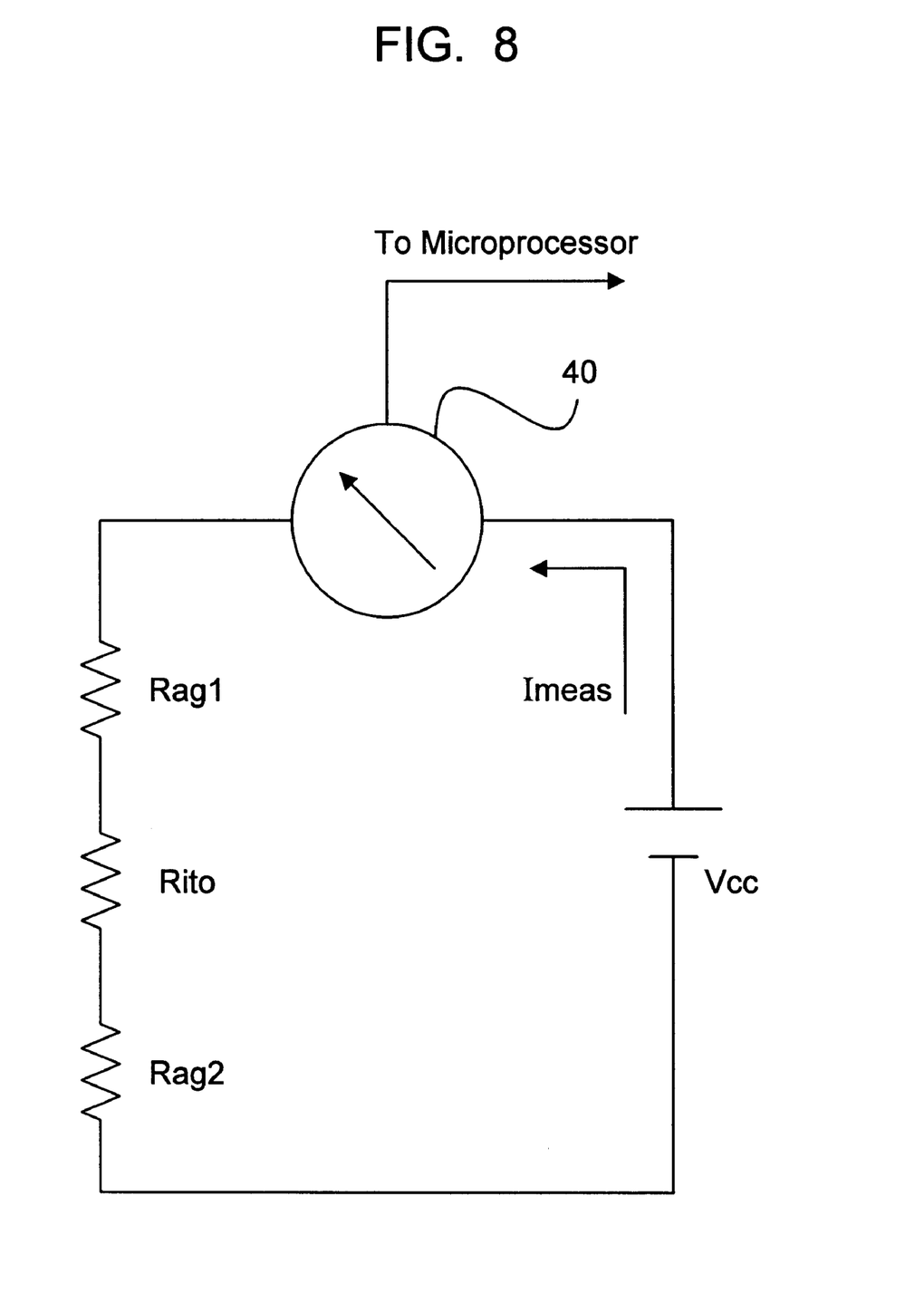
FIG. 8 is an equivalent circuit of a touch screen according to an embodiment of the invention.

According to the invention, a method and system for automatically calibrating a resistive touch screen are provided. An equivalent circuit block diagram of the new system is shown in FIG. 8. This is the same as the equivalent circuit of FIG. 4 except that there is a current metre 40 equipped to measure the current Imeas which flows through the string of resistances Rag1, Rito, and Rag2. By measuring Imeas, new values for Vdrop1, Vdrop2 and Vito may be computed by the microprocessor according to $$Vdrop1 = Rag1 * Imeas$$

$$Vdrop2 = Rag2 * Imeas$$

$$Vito = Vcc - (Rag1 + Rag2) * Imeas$$

Or, in terms of ADC counts, $$ADVdrop = (Rag1 * Imeas)/sampling\ step$$

$$ADVito = (Vcc - (Rag1 + Rag2) * Imeas)/sampling\ step.$$

These two new values may then be used in the above equation for ADVcor to create a new corrected look-up table. A value for Rag1, Rag2, must have initially been measured and stored for subsequent use in computing these corrected voltages and ADC counts.

Alternatively Vdrop1 and Vdrop2 may be determined form $$Rtotal = Rag1 + Rag2 + Rito = Vcc/Imeas$$

$$Vdrop1 = Vcc * Rag1/Rtotal$$

$$Vdrop2 = Vcc * Rag2/Rtotal$$

Figure 9:
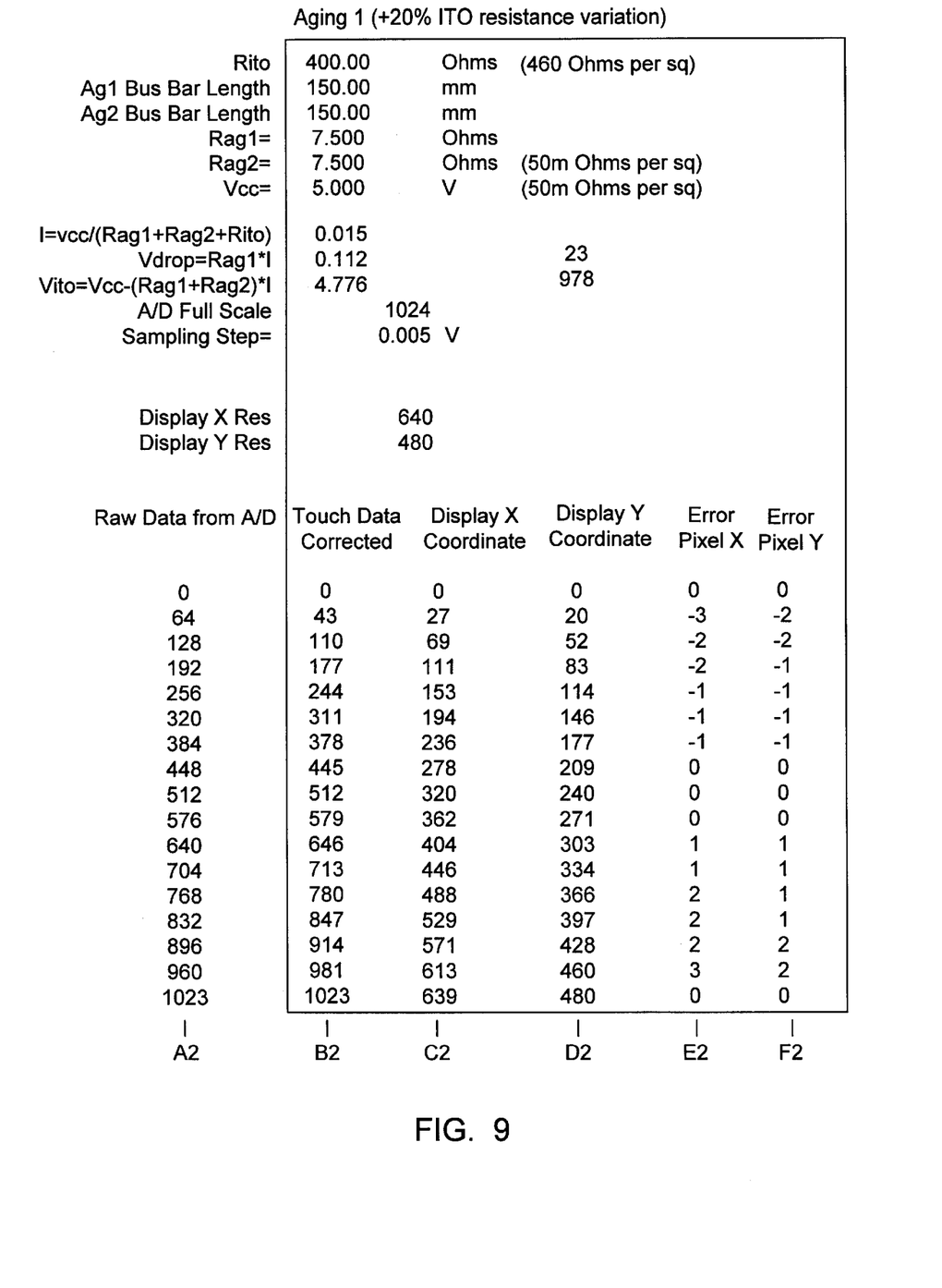
FIG. 9 is a tabulation of a touch screen calibration performed for the circuit of FIG. 8.

For example, referring now to FIG. 9, a corrected version of the look-up table of FIG. 6 has been developed. In this case, the resistance Rito is assumed to have changed to 320 Ohms from 400 Ohms. This is reflected in a change in the measured current Imeas which has increased to 0.015 A from 0.012 A. Vdrop2 has changed from 0.09 V to 0.112 V, and Vito has changed from 4.819 V to 4.776 V. In Columns A2,B2,C2 and D2, values for ADVout, ADcor, X coordinates, Y coordinates are tabulated. In column E2 and F2, the error in the pixel computation which would have resulted in the absence of the recalibration is tabulated for each value of ADVout.

Figure 10:
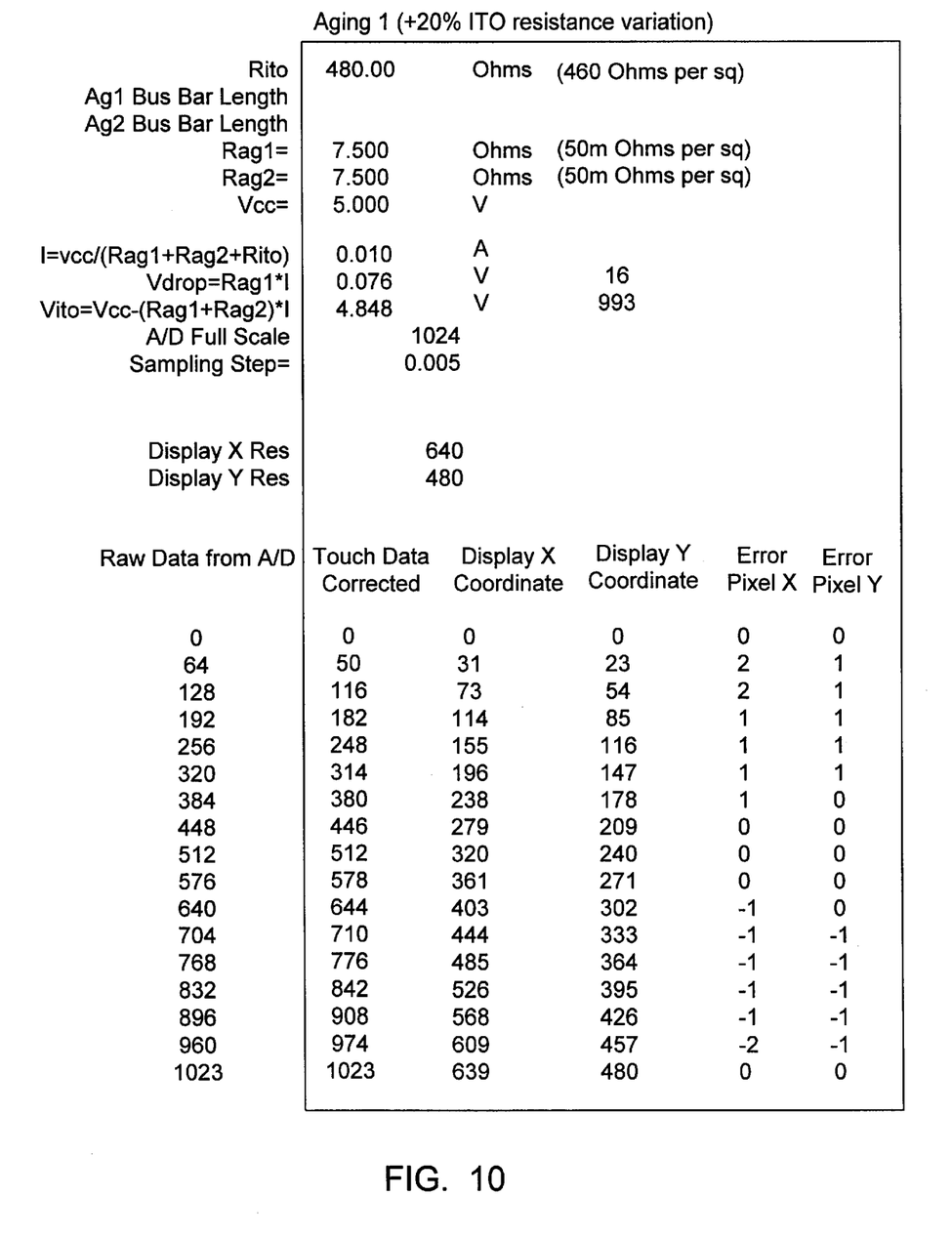
FIG. 10 is another tabulation of a touch screen calibration performed for the circuit of FIG. 8.

In yet another example, referring now to FIG. 10, another corrected look-up table is developed for the case where Rito has changed from 400 Ohms to 480 Ohms.

Figure 11:
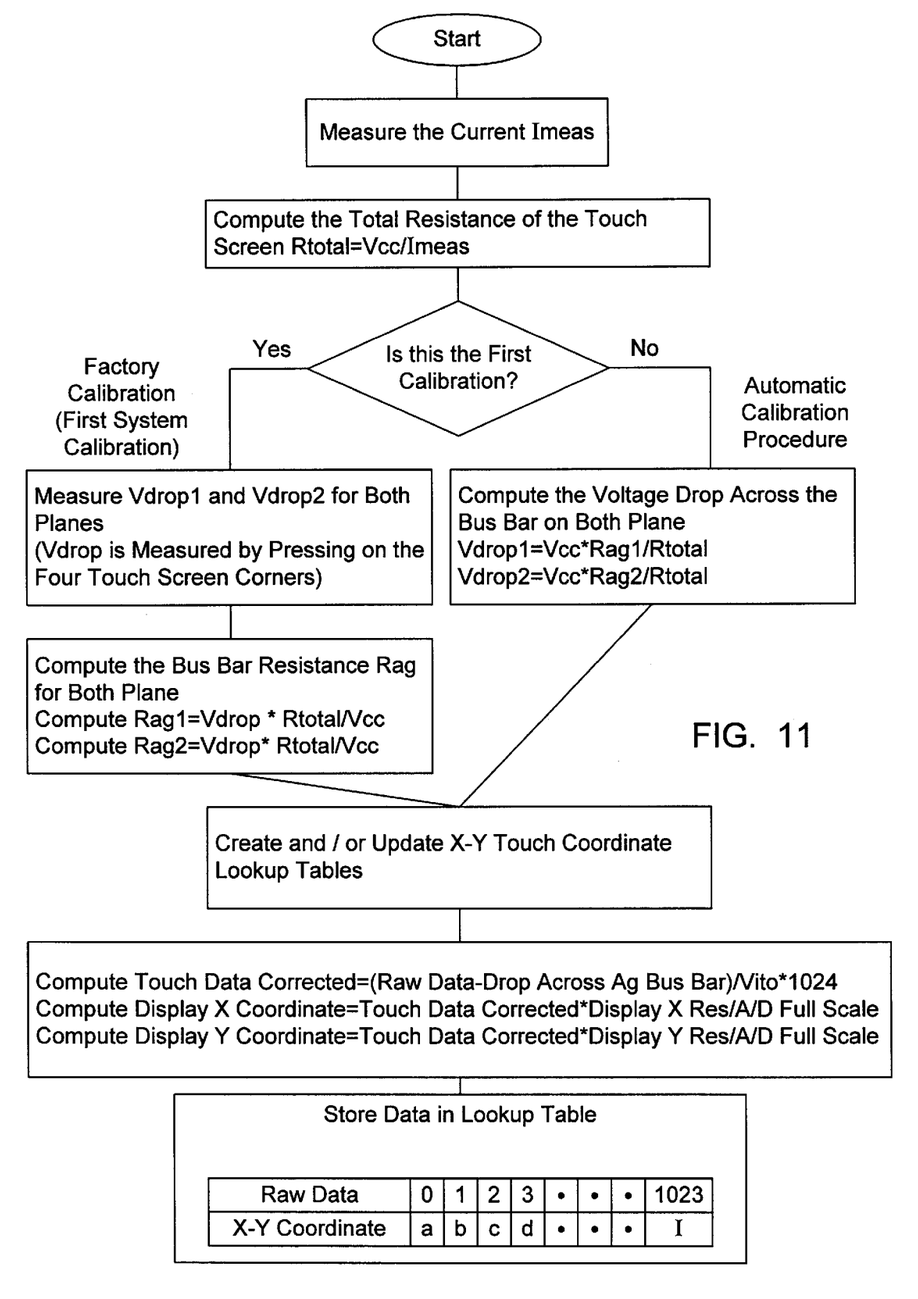
FIG. 11 is a flowchart of a recalibration procedure according to an embodiment of the invention.

Referring now to FIG. 11, an example of a high level calibration algorithm will be described which includes both the factory calibration (first calibration) and subsequent recalibrations. In either case, the first step is to measure the current Imeas with the current monitor. The total resistance of the touch screen is then computed using Rtotal=Vcc/Imeas. After this, depending on whether it is the first calibration or a subsequent recalibration, different steps are performed.

In the case that it is the factory calibration, Vdrop1 and Vdrop2 must be measured for both planes. Using these measurements, the bus bar resistances for both planes must be computed using Rag1=Vdrop1*Rtotal/Vcc, and Rag2=Vdrop2*Rtotal/Vcc.

In the case that it is a subsequent recalibration, the next step is to recompute the voltage drop across the bus bars on both planes using Vdrop1=Vcc*Rag1/Rtotal, and Vdrop2=Vcc*Rag2/Rtotal.

Then, in both cases, the X–Y coordinate look-up tables are either created or updated which convert raw A–D counts into corrected A–D counts and display X and Y coordinates. These are then stored in memory.

The automatic calibration procedure may be performed either upon the request of a user through some user interface, or periodically under the control of a timer of some sort.

Numerous modifications and variations of the present invention are possible in light of the above teachings. It is therefore to be understood that within the scope of the appended claims, the invention may be practised otherwise than as specifically described herein.

While in the illustrated embodiment, Rag1 and Rag2 are measured and a current meter is used to measure a parameter which may subsequently be used to recalibrate the touch screen, other parameters may be measured directly instead. Furthermore in its broadest aspect, the invention does not require the step of measuring Rag1 and Rag2 as these may be known.

More generally, one or more initial parameters are required which will allow the determination of Rag1 and Rag2. This may consist of actual values for Rag1, Rag2, or may consist of voltage drop and current values.

Furthermore, during recalibration, at least one calibration parameter must be measured which will permit the computation of Vdrop1 and Vdrop2. This is not to say that Rag1, Rag2, Vdrop1, and Vdrop2 are all necessarily computed. However, given the parameters which would allow for their computation, the necessary recalibration may be performed.

For example, measuring Vdrop1, Vdrop2 and Imeas as initial parameters will permit the determination of Rag1 and Rag2. Measuring Rtotal=Rag1+Rag2+Rito as a recelebration would permit the computation of Vdrop1 and Vdrop2 given that Rag1 and Rag2 are known computable. Measuring Rito as the recelebration parameter would permit the computation of Vdrop1, Vdrop2 given that Rag1 and Rag2 are computable. There are many permutations.

For certain applications, it may be desirable to perform a recalibration for only a single touch screen layer. When recalibration is to be done for both touch screen layers, one may refer to Rag1, Rag2, Rito, Vdrop1, Vdrop2, Vito, VA, VB, respectively as:

for the first resistive touch screen layer: Rag1, Rag2, Rito1, Vdrop1, Vdrop2, Vito1, VA1, and VB1; and for the first resistive touch screen layer: Rag3, Rag4, Rito2, Vdrop3, Vdrop4, Vito2, VA2, and VB2.

One or more parameters must be initially determined and stored which permit the determination of Rag1, Rag2, Rag3 and Rag4. It may be that all of the bus bar resistances Rag1, Rag2, Rag3, and Rag4 may be assumed to be a constant in which case the initial parameters need only permit the determination of a single one of these resistances.

During recalibration, a separate recalibration parameter may be measured for each touch screen layer which allows the determination of the voltages Vdrop1, Vdrop2, Vdrop3, and Vdrop4. Separate lookup tables are then rederived for each touch screen layer, one for each axis. Alternatively, during recalibration, it may be assumed that Rito1 and Rito2 will change in both touch screen layers in the same manner in which case a single recalibration parameter will suffice for both layers. This is because given a recalibration parameter which permits the measurement of Vdrop1 and Vdrop2 (or Vdrop3 and Vdrop4), Rito1 (or Rito2) may be derived and used to compute the voltage drop measurements Vdrop3 and Vdrop4 (or Vdrop1 and Vdrop2) for the remaining one of the two layers.

In the illustrated embodiments, a look up table is re-derived each time recalibration is performed, and X and Y coordinates are determined from the look up table. Alternatively, X and Y may be computed directly in real time from the voltage Vout using the microprocessor for example. For example, the equations X=$m_1$ Vout+$b_1$, Y=$m_2$ Vout+$b_2$ may be used. These equations are defined by the four parameters $m_1, m_2, b_1, b_2$. When a recalibration is performed, these parameters are simply updated.

In the case of real time X,Y computations, only the equations are stored in memory, and no look-up tables are created. When a recalibration occurs, the equation parameters are updated and stored in memory.

In the most general case, recalibration simply updates parameters which allow the determination of spatial output calculation coordinates. These output parameters may consist of a look-up table, equation parameters for example.

The embodiments of the invention in which an exclusive property or privilege is claimed are defined as follows:

1. A method of recalibrating a resistive touch screen layer of a touch screen apparatus, the touch screen layer having a first bus bar with a constant resistance Rag1, and a second bus bar with a constant resistance Rag2, and a conductive layer between the two bus bars having a resistance Rito which is subject to change over time, wherein a voltage Vcc applied across Rag1, Rito and Rag2 results in voltage drops Vdrop1, Vito, and Vdrop2 across respective resistances Rag1, Rito and Rag2, wherein when the conductive layer is touched at a particular point, a voltage divider is created having a raw output which is a function of (Vdrop2+VB)/Vcc where VB is the voltage across a portion of Rito between Rag2 and the particular point, and wherein at least one initial parameter is stored in the touch screen apparatus which will permit the determination of Rag1 and Rag2, the method comprising the steps of:

measuring at least one calibration parameter which together with the at least one initial parameter will permit the computation of Vdrop1 and Vdrop2;

using the at least one calibration parameter to create a look-up table which maps a set of said output values, the set being a function of (Vdrop2+VB)/Vcc, onto a corrected set of output values, the corrected set being a function of VB/Vito.

2. A method according to claim 1 further comprising the step of measuring said initial parameter during an initial setup step.

3. A method according to claim 1 wherein the at least one initial parameter comprises Rag1 and Rag2.

4. A method according to claim 1 wherein the at least one initial parameter comprises initial values for Vdrop1 and Vdrop2.

5. A method according to claim 1 wherein the at least one calibration parameter comprises the resistance Rito.

6. A method according to claim 1 wherein the at least one calibration parameter comprises a resistance Rtotal which equals Rag1+Rag2+Rito.

7. A method according to claim 1 wherein the at least one calibration parameter comprises a measured current Imeas which flows through Rag1, Rito, and Rag2 due to Vcc.

8. A method according to claim 1 wherein the raw output is an ADC (analog-to-digital converter) count representation of the voltage Vdrop1+VB, the ADC count representation converting Vcc to an ADC-fullscale value.

9. A method according to claim 8 wherein the corrected output is an ADC count representation of the voltage VB, the ADC representation converting Vito to an ADC-fullscale value.

10. A method according to claim 9 further comprising the step of converting the corrected output into a coordinate measurement.

11. A method according to claim 1 further comprising the step of converting the corrected output into a coordinate measurement.

12. A method according to claim 1 wherein the touch screen apparatus has two such touch screen layers, one for determining an X axis measurement and another for determining a Y axis measurement, and wherein the recalibration method is performed twice, once for each touch screen layer.

13. A method according to claim 1 wherein the touch screen apparatus has two such touch screen layers, one for determining an X axis measurement and another for determining a Y axis measurement, and wherein an assumption is made that the change in Rito for each of the two layers over time is the same, the method further comprising the steps of:

based upon said assumption and the recalibration parameter measured for one of the two layers, deriving a recalibration parameter for the remaining layer;

performing twice the step of using the at least one calibration parameter to create a look-up table, once for each of the two layers.

14. A recalibratable resistive touch screen apparatus comprising a resistive touch screen layer having a first bus bar with a constant resistance Rag1, and a second bus bar with a constant resistance Rag2, and a conductive layer between the two bus bars having a resistance Rito which is subject to change over time, wherein a voltage Vcc applied across Rag1, Rito and Rag2 results in voltage drops Vdrop1, Vito, and Vdrop2 across respective resistances Rag1, Rito and Rag2,     an ADC (analog-to-digital converter) connected to produce a raw ADC count representative of a voltage across a portion of Rito and Rag2 when the conductive layer is touched at a particular point, the raw ADC count being a function of (Vdrop2+VB)/Vcc where VB is the voltage across the portion of Rito between Rag2 and the particular point,     a processing means connected to receive the raw ADC count;

means for initially storing at least one initial parameter which will permit the determination of Rag1 and Rag2;

means for measuring at least one calibration parameter which together with the at least one initial parameter will permit the computation of Vdrop1 and Vdrop2;

wherein the processing means is for using the at least one calibration parameter to create a look-up table which maps a set of said output values, the set being a function of (Vdrop2+VB)/Vcc, onto a corrected set of output values, the corrected set being a function of VB/Vito.

15. An apparatus according to claim 14 wherein the at least one initial parameter comprises Rag1 and Rag2.

16. An apparatus according to claim 14 wherein the at least one initial parameter comprises initial values for Vdrop1 and Vdrop2.

17. An apparatus according to claim 14 wherein the at least one calibration parameter comprises the resistance Rito.

18. An apparatus according to claim 14 wherein the at least one calibration parameter comprises a measured current Imeas which flows through Rag1, Rito, and Rag2 due to Vcc, the means for measuring the calibration parameter comprising a current meter.

19. An apparatus according to claim 18 wherein the corrected output is an ADC count representation of the voltage VB, the ADC representation converting Vito to an ADC-fullscale value.

20. An apparatus according to claim 14 wherein the ADC converter has a fullscale reading of ADC-fullscale to which Vcc is converted, and the raw output is an ADC count representation of the voltage Vdrop1+VB.

21. A recalibratable resistive touch screen apparatus comprising:

a first resistive touch screen layer having a first bus bar with a constant resistance Rag1, and a second bus bar with a constant resistance Rag2, and a first conductive layer between the first and second bus bars having a resistance Rito1 which is subject to change over time, wherein a voltage Vcc applied across resistances Rag1, Rito1 and Rag2 results in voltage drops Vdrop1, Vito1, and Vdrop2 across respective resistances Rag1, Rito and Rag2,     a second resistive touch screen layer having a third bus bar with a constant resistance Rag3, and a fourth bus bar with a constant resistance Rag4, and a second conductive layer between the third and fourth bus bars having a resistance Rito2 which is subject to change over time, wherein a voltage Vcc applied across resistances Rag3, Rito2 and Rag4 results in voltage drops Vdrop3, Vito2, and Vdrop4 across respective resistances Rag3, Rito2 and Rag4, and wherein the third and fourth bus bars are parallel with each other and perpendicular with the first and second bus bars;

an ADC (analog-to-digital converter) connected to

1) produce a first raw ADC count representative of a first voltage across a portion of Rito1 and Rag2 when the first conductive layer is touched at a particular point while the voltage Vcc is applied there across, the first raw ADC count being a function of (Vdrop2+VB1)/Vcc where VB1 is the voltage across the portion of Rito between Rag2 and the particular point, and     2) produce a second raw ADC count representative of a second voltage across a portion of Rito2 and Rag4 when the second conductive layer is touched at said particular point while the voltage Vcc is applied there across, the second raw ADC count being a function of (Vdrop4+VB2)/Vcc where VB2 is the voltage across the portion of Rito2 between Rag4 and the particular point;

a processing means connected to receive the raw ADC counts;

means for initially storing at least a first initial parameter which will permit the determination of Rag1, Rag2, Rag3, and Rag4;

means for measuring at least one calibration parameter which together with the at least one initial parameter will permit the computation of Vdrop1, Vdrop2, Vdrop3, and Vdrop4;

wherein the processing means is for using the at least one calibration parameter to create a first look-up table which maps a set of said first raw ACD counts, the set being a function of (Vdrop2+VB1)/Vcc, onto a first corrected set of output values, the first corrected set being a function of VB1/Vito1, and to create a second look-up table which maps a set of said second raw ACD counts, the set being a function of (Vdrop4+VB2)/Vcc, onto a second corrected set of output values, the second corrected set being a function of VB2/Vito2.

* * * * *